US006240341B1

(12) United States Patent
Snyder

(10) Patent No.: US 6,240,341 B1
(45) Date of Patent: May 29, 2001

(54) FLIGHT MANAGEMENT SYSTEM (FMS) WITH INTEGRATED BIT MAPPED DATA CHARTS

(75) Inventor: Mark Issac Snyder, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/232,317

(22) Filed: Jan. 18, 1999

(51) Int. Cl.[7] .............................. G05D 3/00; G06G 7/76
(52) U.S. Cl. .................. 701/3; 701/14; 701/120; 701/211; 345/507; 345/509; 345/353
(58) Field of Search ................ 701/3, 200, 207, 701/120, 211, 14; 340/988, 990, 995; 345/509, 507, 97, 98, 353

(56) References Cited

U.S. PATENT DOCUMENTS 5,057,835 * 10/1991 Factor et al. ..................... 340/995
5,089,816 * 2/1992 Holmes, Jr. ....................... 701/207
5,179,638 * 1/1993 Dawson et al. .................... 395/125
5,392,392 * 2/1995 Fischer et al. ..................... 395/162
5,732,384 * 3/1998 Ellert et al. ....................... 701/120
5,760,793 * 6/1998 Ellert et al. ....................... 345/509
5,870,074 * 2/1999 Iwasaki ............................. 345/141

* cited by examiner

Primary Examiner—Jacques H. Louis-Jacques

(57) ABSTRACT

An aircraft Flight Management System (FMS) simultaneously displaying FMS navigation data and geographically referenced bitmap data charts. The bitmap data charts are properly registered with the various FMS navigation data to achieve proper registration of the data. A common distance algorithm, known as Sedonos Equations, are utilized to determine the distance of each data point with reference to a map center position, such as the current position of the aircraft, a waypoint or a map corner. The system and technique allows for an arbitrary number of bitmapped data charts to be tiled, overlapped, rotated and scaled. The latitude and longitude coordinates of each data point, as well as the corners of the charts, are utilized to determine the distance of the various data points from the aircraft to achieve proper registration when simultaneously displayed.

27 Claims, 3 Drawing Sheets

FLIGHT MANAGEMENT SYSTEM (FMS) WITH INTEGRATED BIT MAPPED DATA CHARTS

FIELD OF THE INVENTION

The present invention is generally related to aircraft cockpit instrumentation including flight computers, navigation equipment and the like, and more particularly to a flight management system (FMS) displaying navigation data during flight including waypoints, airports and navaids.

BACKGROUND OF THE INVENTION

Military, commercial and private aircraft are equipped with a variety of cockpit instrumentation including flight computers, Primary Flight Displays (PFD), radios and gauges. A particular cockpit instrument is known as a Flight Management System (FMS) which formats FMS navigation data and forwards the data to a display system for display during flight for a pilot. The FMS navigation data can include waypoints, distances and headings between waypoints, airports and navaids, and are displayed in real-time during flight to chart a course from an origination point to a destination point. Prior to flight, the latitude and longitude of the various waypoints, airports, and navaids are programmed into the FMS computer to chart the intended course, forming a portion of the flight plan.

Referring to FIG. 1, there is illustrated a conventional FMS display illustrating various waypoints 12 plotted along a course from an origination point A to a destination point B. Each waypoint 12 is symbolically represented by a triangle symbol, and has associated therewith a latitude and a longitude abbreviated as LAT and LNG, respectively. A line interconnects the various waypoint triangular symbols 12, and may be further identified with a distance in nautical miles, as well as a heading in degrees between the associated waypoints. The autopilot may fly the aircraft point to point based on the latitude and longitude points of the waypoints, or the pilot may manually fly the aircraft the identified distance at the identified heading along the charted course.

Other flight computers are provided with other various information including Instrument Flight Rule (IFR) charts, and Visual Flight Rule (VFR) charts which identify various other navigation data including weather maps, approach charts, airports, cities and navaids. Each chart corresponds to a representative small portion of the earth. During flight, the pilot may ascertain the IFR and VFR charts individually to determine weather conditions and the airports proximate the aircraft during flight as well as various cities, geographic landmarks and terrain to aid in navigation. These IFR and VFR charts may further be provided with filters, such as filters to screen out the airports that have suitable landing facilities for the particular aircraft should there be an emergency. For instance, if the aircraft is a Fokker 100, the VFR charts may have a filter visually rendering and identifying only airports having suitable landing facilities for this particular aircraft.

One problem with conventional aircraft systems is that these IFR and VFR charts are only alternately displayed upon selection, and are not simultaneously displayed with the FMS navigation data including waypoints. The IFR and VFR charts are typically comprised of bitmapped image data that is stored in memory, and typically form rectangular charts, each corner of the chart having a specific latitude and longitude.

One particular problem is that these rectangular bitmapped charts are rectangular, yet the earth is a sphere and thus has a curved surface. Hence, while the charts are stored in memory as rectangular charts, the charts cannot simply be tiled together to represent a portion of the earth and simultaneously displayed with FMS navigation data since the chart corners, chart data and FMS navigation data do not necessarily align and register with one another due to the curvature of the earth.

FIG. 2 illustrates this problem. If the rectangular bitmapped data charts 14 were simply tiled together and merged with the FMS navigation data, the various airport and navaid symbols will not align and register with the various waypoint symbols, especially when the waypoint and the airport or navaid, for instance, have an identical latitude and longitude. For instance, the airport symbol 16 representing Longview, Tex., labeled as LNG, does not align with the associated waypoint 12 even though they have a common latitude and longitude. Again, this is due to the fact that the earth has a curved surface and causes the FMS data to be skewed from the bitmapped data of the VFR chart. Likewise, other VFR and IFR data including approach charts, weather radar and so forth will tend to be skewed from the FMS data if the bitmapped charts were simply merged with the FMS data as shown in FIG. 2.

There is desired an improved aircraft display including an improved Flight Management System (FMS) that can integrate the bitmapped data charts such that the bitmapped data is properly registered and simultaneously displayed with the FMS navigation data including waypoints.

SUMMARY OF THE INVENTION

The present invention achieves technical advantages as an aircraft display device having bitmapped data simultaneously displayed and properly registered with FMS navigation data, whereby a common distance algorithm is applied to all data based on a map center position. A graphics rendering technique known as texture mapping is applied to the rectangular bitmapped data images to form polygons. The polygon bitmapped data is then overlaid in real-time with the FMS navigation data including waypoints and properly registered therewith to provide an integrated display simultaneously displaying FMS navigation data and the bitmapped data. All of the data, including the FMS navigation data and the bitmapped data, is referenced to a map center latitude/longitude position, such as the current position of the aircraft, a waypoint or a corner of a map. The distance algorithm is preferably based on Sedonos Equations to accurately determine the distance of the various data from the aircraft, thus achieving registration on the single display. The present invention allows for an arbitrary number of bitmapped data charts to be tiled, overlapped, rotated or scaled on the display.

The present invention comprises an aircraft display device including a texture memory storing at least one bitmapped image data chart comprising geographically referenced bitmapped image data. The aircraft display device further includes a display and a processor having an input for receiving a signal indicative of a predetermined position, such as the current position of the aircraft, a waypoint or a corner of a map. The processor processes the bitmapped image data as a function of the predetermined position and simultaneously displays both the processed bitmapped image data and the received navigation data on the display. The processor processes the bitmapped image data and navigation data according to an algorithm which computes a distance of the bitmapped image data and the navigation data from the predetermined position, this algorithm preferably being based on Sedonos Equations. The bitmapped image data charts comprise rectangular charts, wherein the processor renders the bitmapped image data charts to polygon images. The processing preferably is performed using texture mapping to render the rectangular charts to the polygon images. The texture memory preferably stores a plurality of the bitmapped image data charts, whereby these charts are tiled when displayed as the polygon images on the display. The polygon images may also be overlapped, rotated or scaled. The processor has an input for receiving the FMS navigation data including waypoints, airports and navaids.

The method of the present invention comprises processing and displaying aircraft image data in a flight management system comprising the step of first determining a predetermined position, such as the current position of the aircraft, a waypoint or a corner of a map. At least one bitmapped image data chart comprising geographically referenced bitmapped image data is then processed as a function of the predetermined position, and then the processed bitmapped image data is displayed on a display. The bitmapped image data chart is stored in a texture memory, and comprises a rectangular image. The method further comprises the step of rendering the rectangular image into a polygon image. The bitmapped image data is processed to determine a distance of the bitmapped image data from the predetermined position. Preferably, both an X and a Y distance of the corners of the bitmapped image are computed to determine the distance of the corners from a map reference, such as current aircraft position. Sedonos Equations are utilized to determine the distance of the bitmapped image corners from the map reference position. The resulting polygon image is rendered using a texture mapping technique. The method further comprises the step of overlaying navigation data on the rendered polygon images such that the navigation data is properly registered with the bitmapped data displayed in the polygon image, whereby the navigation data is processed to determine a distance from the map reference, such as current aircraft position. The navigation data preferably comprises waypoints, airports and navaids, whereby the bitmapped image data may comprise IFR and VFR charts as well as other flight charts. Preferably, a plurality of bitmapped data image charts are processed and rendered into separate polygon images. These polygon images can be tiled, overlapped, rotated or scaled when displayed.

DESCRIPTION OF THE PREFERRED EMBODIMENT

Figure 1:
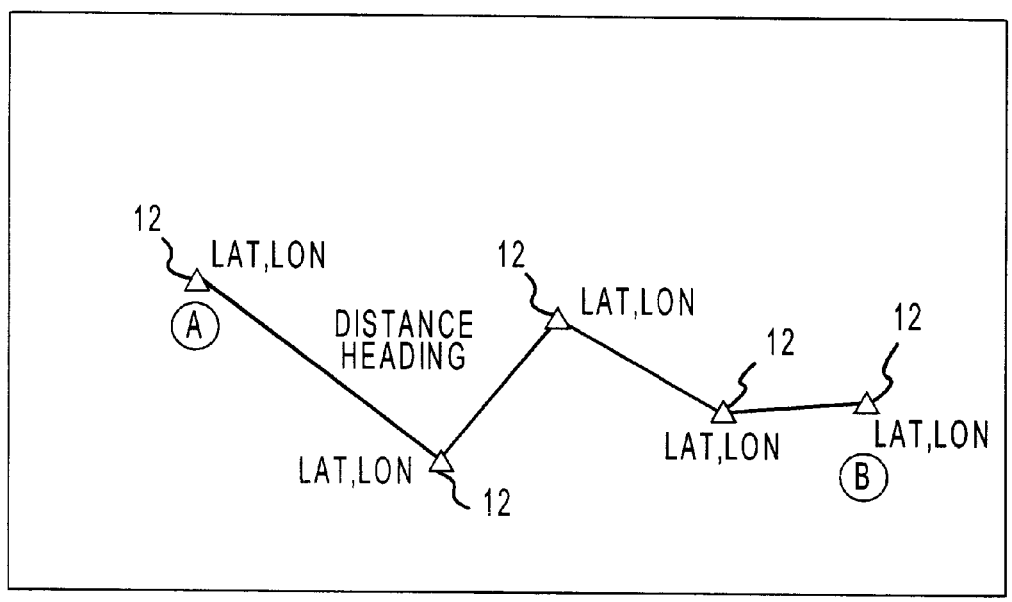
FIG. 1 is an illustration of a conventional FMS display illustrating various waypoints determining a flight plan from an origination point A to a destination point B, including the various latitude and longitude identifiers with the various waypoints.
Figure 2:
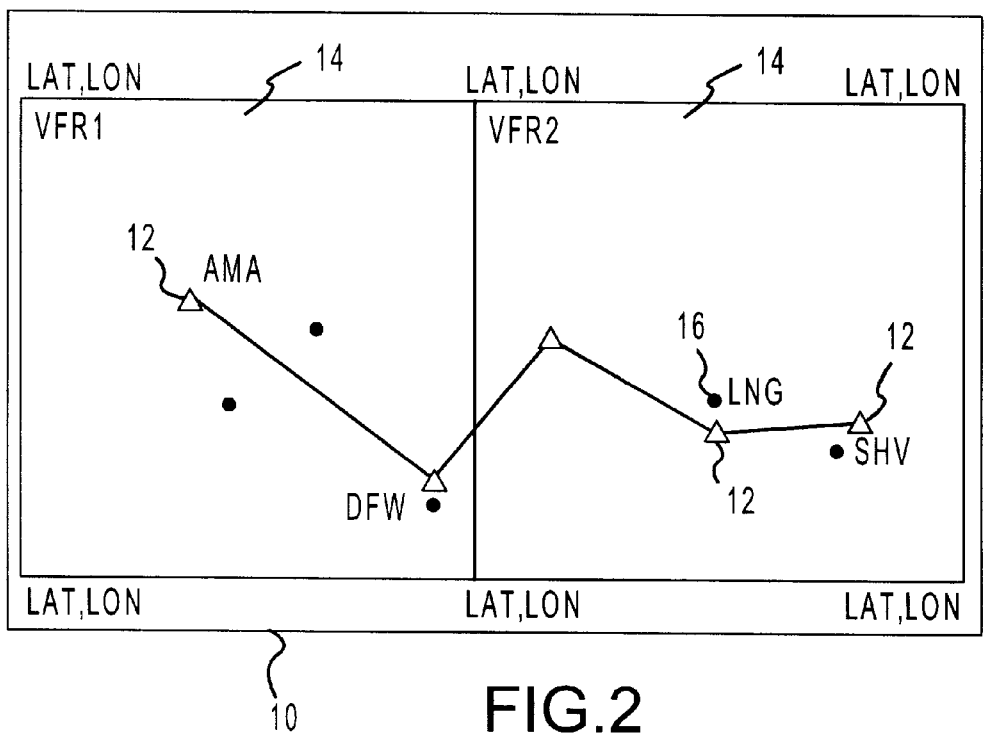
FIG. 2 is an illustration of the problem realized by simply merging bitmapped image data charts with the FMS navigation data of FIG. 1, illustrating the non-registration of the bitmapped data with the navigation data.
Figure 3:
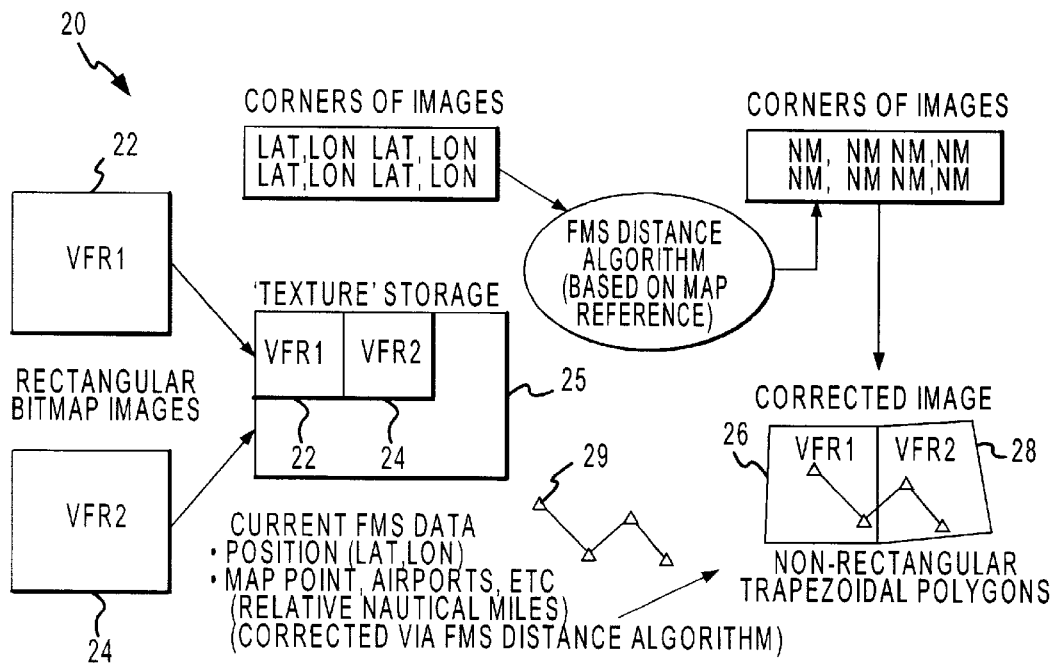
FIG. 3 is a block diagram of the present invention illustrating the rectangular bitmapped images processed using a graphics rendering technique called texture mapping, which renders the bitmapped data images to polygons and then simultaneously displays the navigation data with the bitmapped images such that all data is properly registered.

Referring now to FIG. 3, there is generally shown at 20 a block diagram of present invention whereby the rectangular bitmapped image charts 22 and 24 stored in a texture memory 25 are processed using a graphics rendering technique called texture mapping to render the rectangular bitmapped data image charts to polygon images 26 and 28, respectively. All of the FMS navigation data generally shown at 29, as well as the bitmapped data in the rectangular bitmapped image charts, are all simultaneously displayed on display 21 and are processed using the same distance algorithm to determine the relative distance, in nautical miles, of the data from a known map center point, such as the current position of the aircraft, a waypoint or a map corner. All data is properly registered on display 21 since all data is referenced to the map center point, which is shown in this example as the current position of the aircraft. The latitude and longitude of all data, including the corners of the bitmapped image charts, the bitmapped data, and the various navigation data including waypoints, airports and navaids, are utilized to calculate the respective distance from the aircraft current position using a distance algorithm. The distance algorithm preferably comprises Sedonos Equations, which accurately determine the relative distance in nautical miles of each point from the map center point, such as the current position of the aircraft. This allows all data to be simultaneously displayed on a single display 21, and to be properly registered with the other data.

One form of Sedonos Equations are represented as follows, although others Sedonos Equations are available and suitable for the present invention:

Sedono's Equation are given by $Xdelta = R \times \cos(RLat \times \sin((RLon) - (RLonRef));$ $Ydelta = R \times (\sin(RLat - RLatRef) + (\cos(RLat) \times \sin(RLatRef) \times (1 - \cos(RLon - RLonRef))));$ Where:

RLatRef=Latitude of Map Reference Point in radians

RLonRef=Longitude of Map Reference Point in radians

RLat=Latitude of point to measure distance to in radians

RLon=Longitude of point to measure distance to in radians

R=Radius of the earth in nautical miles

Xdelta=Distance that measure point is east of reference point

Ydelta=Distance that measure point is north of reference point

Figure 4:
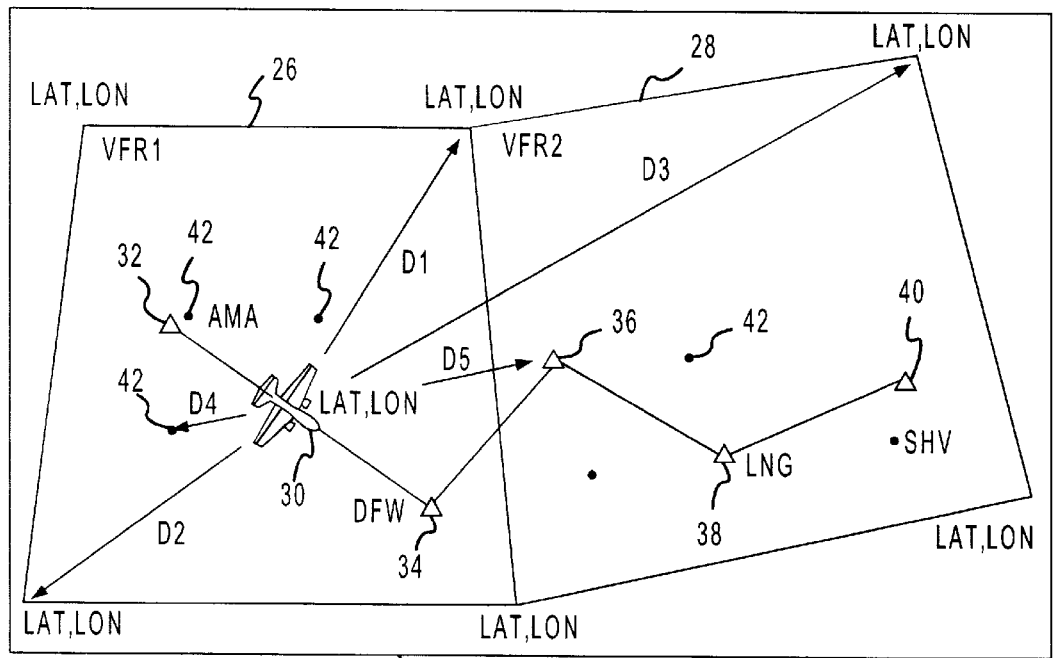
FIG. 4 is an illustration of the aircraft display of the present invention having the polygon bitmapped data being simultaneously displayed and properly registered with the FMS navigation data, whereby all navigation data and bitmapped data is registered using the same distance algorithm based on the current position of the aircraft as a map center.

As depicted in FIG. 4, the rectangular bitmapped image charts 22 and 24 are texture mapped to render respective polygons 26 and 28. The first rectangular bitmapped image 22, identified as a Visual Flight Rule map VFR1, is properly registered with the second bitmapped data chart 24, identified as VFR2. The first rectangular bitmap image 22 is rendered using real-time texture mapping to form polygon 26. The second rectangular bitmap image chart 24 is rendered as a polygon 28, whereby the common side of each chart is overlaid with the other in this example where charts 22 and 24 are contiguous. Due to the curvature of the earth's surface and the position of the aircraft from various points, the rectangular bitmap image charts 22 and 24 are "warped" using the texture mapping graphics rendering technique forming the polygons 26 and 28, respectively.

The corners of each polygon 26 and 28 have associated therewith an associated latitude and longitude, abbreviated as LAT, LNG, respectively. The position of the aircraft is depicted at 30 and has a known latitude and longitude ascertained using on-board various navigation equipment such as a GPS locator. The distance between the aircraft 30 and the various corners of the polygon images, the bitmapped data points, and navigation data including waypoints, depicted as distances D1, D2, D3, D4 and D5, wherein distances D1–D5 are representative of x, y cartisian coordinates in nautical miles, are calculated using the distance algorithm preferably being based on Sedonos Equations. The distance in nautical miles to the corner of the polygon images and data points identified by the known corresponding latitude and longitude data is determined using the Sedonos Equations, whereby an X and a Y distance is determined using the Sedonos Equations. The polygons are preferably trapezoids, as shown. The distance to the various waypoints, identified at 32, 34, 36, 38 and 40 are determined using the Sedonos Equations to accurately determine in nautical miles the distance of the various waypoints from the current position of the aircraft shown at 30. Similarly, the distance to the various bitmapped data depicted as dots identifying cities, landmarks, approach references and so forth are determined using the Sedonos Equations.

Each of these references may have associated therewith an identifier symbol indicating the reference. As depicted in FIG. 4, the reference identified as AMA may refer to a particular navaid associated with Amarillo, Tex. The navaid identified as SHV may be associated with the particular navaid at Shreveport, La. The navaids don't necessarily align with the waypoints since they may not necessarily be physically located exactly at the airport, as depicted in this example. The waypoint 32 identifying the origination point corresponds to the latitude and longitude of the airport at Amarillo, Tex., and the waypoint 40 is associated with the latitude and longitude of the airport at Shreveport, La. It is noted that some of the inbetween waypoints such as waypoint 34 and 38, also have associated therewith a navaid having the same latitude and longitude, and thus, the dot symbol identifying the navaid is properly registered with the waypoint symbol, such as the navaid is physically located at the airport. DFW refers to Dallas/Fort Worth, and LNG refers to Longview Texas.

The present invention achieves technical advantages whereby the various waypoints register with the various navaids comprising the bitmapped data charts on display 21, especially when they are located at the same latitude and longitude point. Where the various bitmap data is not collocated with any waypoint, it is still, however, properly displayed and registered on display 21 relative to the various waypoints. Again, this is because all data is processed according to the same distance algorithm with relation to the current geographic location of the aircraft, and thus all data is referenced with respect to a common point. Advantageously, the geographically referenced bitmapped data provided in the bitmap charts is correctly and simultaneously displayed with the FMS navigation data on the display 21. During flight, the distance from the various data points with reference to the aircraft are calculated in real time using the distance algorithm. Likewise, the display is updated in real time. The texture mapping graphics rendering technique is sufficiently fast such that the bitmapped data can be processed in real time. An arbitrary number of bitmapped charts can be tiled, overlapped, rotated and scaled, and the bitmapped charts do not have to be contiguous.

Figure 5:
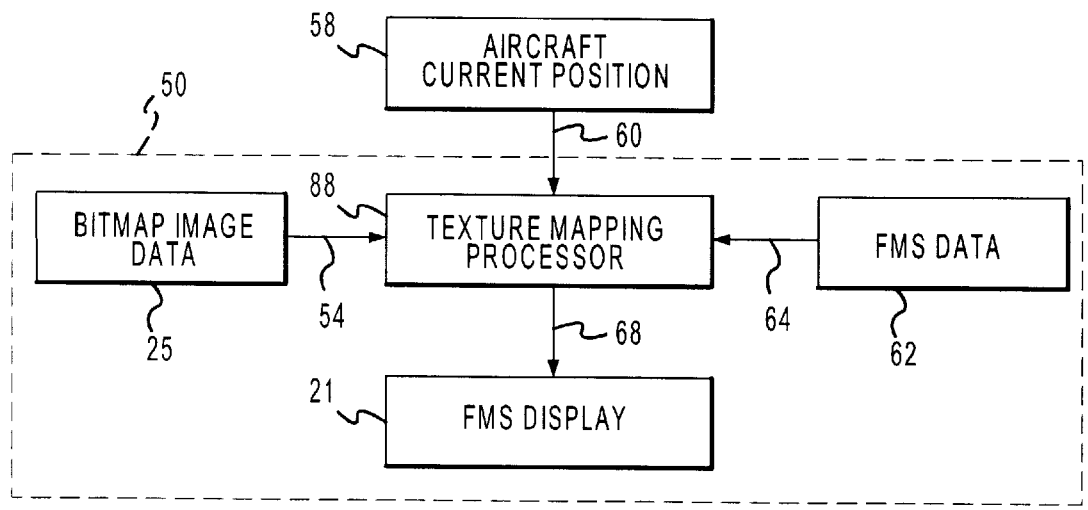
FIG. 5 is a block diagram of the aircraft display system according to the present invention.

Referring now to FIG. 5, there is generally shown at 50 a block diagram of the aircraft display system according to the present invention. Bitmapped image data charts, such as charts 22 and 24, are stored in a texture memory 25 and provided via communication link 54 to a high-speed texture mapping processor 56. The current aircraft position is provided as position signals by a position locator 58, such as a GPS navigation unit, on communication line 60. Flight Management System (FMS) data programmed and stored in an FMS memory 62 is provided via communication line 64 to the texture mapping processor 56. The texture mapping processor 56 processes the bitmapped data and FMS data in realtime and communicates the processed data via communication line 66 to the FMS display 21, which may be a EFIS Display. The texture mapping processor 56 performs texture mapping on the bitmapped image data stored in texture memory 25, and applies the Sedonos Equations to determine the distance of all data in nautical miles from the current aircraft position as provided by the aircraft position locator 58. Specifically, the texture mapping processor 56 determines the distance, in nautical miles, of the FMS data including the various waypoints, as well as the bitmapped data including airports and navaids, and weather data, and overlays all this data with proper registration on the FMS display 21.

Figure 6:
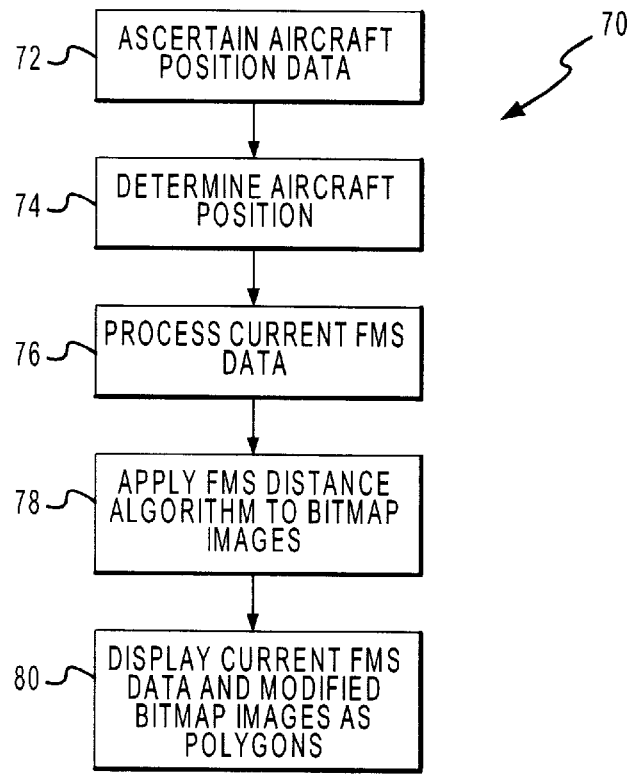
FIG. 6 is a flow diagram of the method of the present invention illustrating the processing of the FMS navigation data and the bitmapped images to render a single display with all data being registered.

Turning now to FIG. 6, there is shown a method of the present invention at 70. At step 72, the texture mapping processor 64 ascertains a known position for a map center, preferably the current aircraft position including the identified latitude and longitude coordinates of the aircraft as provided by the aircraft location device 58. Alternatively, a waypoint, map corner or other land based reference can be used as the map center position. Next, at step 74 the texture mapping processor 56, which may be a microprocessor-based unit, determines the aircraft position. Next, at step 76, the texture mapping processor 56 processes the current FMS data provided from FMS memory 62 to determine the distance in nautical miles of each of the FMS datapoints from the current position of the aircraft. Next, at step 78 the texture mapping processor 56 applies the same distance algorithms to each of the data in the bitmap image charts stored in texture memory 25 to determine the distance in nautical miles of each of these points from the current position of the aircraft. Finally, at step 80, the texture mapping processor 56 displays both the current FMS data and the modified bitmapped images which are rendered as polygons on the FMS display 21.

The method of the present invention properly registers and simultaneously displays all data on a single display, including the FMS navigation data and the bitmapped data, by applying the same distance algorithm to each data point. This includes determining the relative distance in nautical miles of each point of the bitmap charts and the FMS data from a common map point. The display of the "warped" bitmapped chart data is accomplished using the graphics texture mapping rendering technique which applies the bitmapped data to polygons. The present invention provides that an arbitrary number of rectangular bitmapped charts can be tiled, overlapped, rotated and scaled, such as depicted in FIG. 4. Various bitmapped charts can be simultaneously displayed, and the borders do not have to be contiguous.

In summary, the present invention includes the aircraft display device and method of use thereof simultaneously displaying and registering rectangular bitmapped data charts with FMS navigation data. A common distance algorithm, preferably comprising Sedonos Equations, is utilized to determine the distance in nautical miles for each data with reference to a map position, such as the current position of the aircraft to achieve registration. Texture mapping is utilized to render the rectangular bitmapped data charts to polygons in real time during flight.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. An aircraft display device, comprising:
    a texture mapping memory storing at least one bitmapped image data chart comprising geographically referenced bitmapped image data;
    a display; and
    a processor configured to receive a predetermined position, to process navigation data and said bitmapped image data according to an algorithm which computes a distance from said navigation data and said bitmapped image data to said predetermined position, and to display said processed bitmapped image data on said display simultaneously with said navigation data.

2. The aircraft display device as specified in claim 1 wherein said algorithm is based on Sedonos Equations.

3. The aircraft display device as specified in claim 2 wherein said bitmapped image data chart comprises a rectangular chart, wherein said processor renders said bitmapped image data chart to a polygon image.

4. The aircraft display device as specified in claim 3 wherein said processor performs texture mapping to apply said rectangular chart to said polygon image.

5. The aircraft display device as specified in claim 3 wherein said texture mapping memory stores a plurality of said bitmapped image data charts, wherein said charts are tiled when displayed as said polygon images on said display.

6. The aircraft display device as specified in claim 3 wherein said texture mapping memory stores a plurality of said bitmapped image data charts, wherein said charts are overlapped when displayed on said display.

7. The aircraft display device as specified in claim 3 wherein said texture mapping memory stores a plurality of said bitmapped image data charts, wherein said bitmapped image data charts are rotated when displayed on said display.

8. The aircraft display device as specified in claim 3 wherein said texture mapping memory stores a plurality of said bitmapped image data charts, wherein said bitmapped image data charts are scaled when displayed on said display.

9. The aircraft display device as specified in claim 1 wherein said predetermined position comprises a current aircraft position.

10. The aircraft display device as specified in claim 1 wherein said predetermined position comprises a waypoint.

11. A method of processing and displaying aircraft image data in a flight management system, comprising the steps of:
    processing at least one bitmapped image data chart comprising geographically referenced bitmapped image data and navigation data, said processing step comprising the step of determining according to an algorithm a distance from said bitmapped image data and said navigation data to a predetermined position; and
    simultaneously displaying said processed bitmapped data and said navigation data on a display as a function of said distance.

12. The method as specified in claim 11 wherein said bitmapped image data chart is stored in a texture memory and comprises a rectangular image, further comprising the step of rendering said rectangular image into a polygon image in said processing step.

13. The method as specified in claim 12 further comprising the step of overlaying geographically referenced navigation data on said rendered polygon image, whereby said navigation data is processed to determine a distance from said predetermined position.

14. The method as specified in claim 13 wherein said rectangular image is rendered said polygon image using a texture mapping technique.

15. The method as specified in claim 13 wherein said bitmapped image data is properly registered with said navigation data on said display.

16. The method as specified in claim 15 wherein said navigation data comprises waypoints, airports and navaids.

17. The method as specified in claim 15 wherein said bitmapped image data represents Visual Flight Rules (VFR) charts.

18. The method as specified in claim 12 wherein a plurality of said bitmapped image data charts are processed and rendered into separate polygon images.

19. The method as specified in claim 18 wherein said polygon images are tiled when displayed on said display.

20. The method as specified in claim 18 wherein said polygon images are overlapped when displayed on said display.

21. The method as specified in claim 18 wherein said polygon images are rotated when displayed on said display.

22. The method as specified in claim 18 wherein said polygon images are scaled when displayed on said display.

23. The method as specified in claim 11 wherein an X and a Y distance of said bitmapped image data is computed to determine said distance from said predetermined position.

24. The method as specified in claim 11 wherein Sedonos Equations are utilized to determine said distance of said bitmapped image data and said navigation data from said predetermined position.

25. The method as specified in claim 11 wherein said predetermined position comprises a current position of an aircraft.

26. The method as specified in claim 11 wherein said predetermined position comprises a waypoint.

27. An aircraft display device, comprising:
    a display;
    a texture mapping memory comprising geographically-referenced bitmapped image data;
    a processor configured to receive a predetermined position and navigation data, to process said bitmapped image data and said navigation data by computing a distance from said bitmapped image data and said navigation data to said predetermined position, and to simultaneously display said bitmapped image data and said navigation data on said display as a function of said distance.

* * * * *